US 12,546,242 B1

United States Patent
Ratts et al.

(10) Patent No.: US 12,546,242 B1
(45) Date of Patent: Feb. 10, 2026

(54) SYSTEMS AND METHODS FOR MONITORING NITROGEN DIOXIDE VARIABILITY IN AN ENGINE AFTERTREATMENT SYSTEM

(71) Applicant: Caterpillar Inc., Peoria, IL (US)

(72) Inventors: Joshua Lynn Ratts, Pine Village, IN (US); Hrishi Lalit Shah, Peoria, IL (US); Eric Lee Schroeder, Germantown Hills, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/915,088

(22) Filed: Oct. 14, 2024

(51) Int. Cl.
  *F01N 3/20* (2006.01)
  *F01N 3/10* (2006.01)
  *F02D 19/06* (2006.01)
  *F02D 19/08* (2006.01)

(52) U.S. Cl.
  CPC ............. *F01N 3/208* (2013.01); *F01N 3/106* (2013.01); *F01N 3/103* (2013.01); *F01N 3/206* (2013.01); *F01N 3/2066* (2013.01); *F01N 2340/04* (2013.01); *F01N 2370/02* (2013.01); *F01N 2550/02* (2013.01); *F01N 2560/026* (2013.01); *F01N 2570/14* (2013.01); *F01N 2610/02* (2013.01); *F01N 2900/1411* (2013.01); *F01N 2900/16* (2013.01); *F01N 2900/1621* (2013.01); *F01N 2900/1812* (2013.01); *F02D 19/0655* (2013.01); *F02D 19/084* (2013.01)

(58) Field of Classification Search
  CPC ........ F01N 3/0814; F01N 3/103; F01N 3/106; F01N 3/206; F01N 3/2066; F01N 3/208; F01N 2340/04; F01N 2370/02; F01N 2550/02; F01N 2560/026; F01N 2570/14; F01N 2610/02; F01N 2900/04; F01N 2900/0416; F01N 2900/16; F01N 2900/1606; F01N 2900/1411; F01N 2900/1414; F01N 2900/1614; F01N 2900/1621; F01N 2900/1812
  See application file for complete search history.

(56) References Cited

U.S. PATENT DOCUMENTS

| 8,726,641 | B2 | 5/2014 | Zanetti et al. |
| 9,494,096 | B2 | 11/2016 | Pfaffinger |
| 9,550,149 | B2 | 1/2017 | Takaoka et al. |
| 9,752,520 | B2 * | 9/2017 | Pursifull ............. F02D 41/0027 |

(Continued)

FOREIGN PATENT DOCUMENTS

| DE | 102020211729 A1 | 3/2022 |
| WO | WO2020074446 A1 | 4/2020 |

*Primary Examiner* — Binh Q Tran
(74) *Attorney, Agent, or Firm* — Lee & Hayes, PLLC

(57) ABSTRACT

An internal combustion engine system is described herein. The system uses a NOx detector at the exhaust of an internal combustion engine to compensate for the effects of NO2 on the measurements of NOx detectors at other locations, such as the input and the output of an SCR system. A controller uses the difference in measured NOx volume fractions between the NOx detector at the exhaust and other NOx detectors to modify the operation of the combustion engine system as well as, in some examples, determine NO2 created by a device containing a precious metal catalyst, such as precious metal containing diesel particular filter (DPF) and/or a diesel oxidizing catalyst (DOC), that oxidizes a portion of the exhaust from NO to NO2.

20 Claims, 5 Drawing Sheets

(56) References Cited

U.S. PATENT DOCUMENTS

| | | | |
|---|---|---|---|
| 10,662,843 | B2 | 5/2020 | Bahrami |
| 11,149,612 | B2 | 10/2021 | Zhang |
| 11,193,406 | B2 | 12/2021 | Zhang |
| 11,536,183 | B1* | 12/2022 | Ott .................... F01N 3/2013 |
| 2010/0031634 | A1 | 2/2010 | Iida et al. |
| 2013/0232958 | A1* | 9/2013 | Ancimer ............ B01D 53/9495 |
| | | | 422/111 |
| 2016/0084185 | A1* | 3/2016 | Theis ........................ F01N 9/00 |
| | | | 701/105 |
| 2017/0122159 | A1* | 5/2017 | Bahrami ................. F01N 3/208 |
| 2019/0234281 | A1* | 8/2019 | Wiebenga ........... F01N 13/0093 |
| 2020/0116060 | A1* | 4/2020 | Suzuki .................... F01N 3/208 |
| 2023/0037326 | A1* | 2/2023 | Lundström ........ B01D 46/0027 |
| 2024/0209762 | A1* | 6/2024 | Sundararajan .......... F01N 3/208 |

* cited by examiner

SYSTEMS AND METHODS FOR MONITORING NITROGEN DIOXIDE VARIABILITY IN AN ENGINE AFTERTREATMENT SYSTEM

TECHNICAL FIELD

The present disclosure relates to internal combustion engines, and more particularly, to using an engine out NOx detector to compensate for nitrogen dioxide variability in an exhaust of the engine.

BACKGROUND

Internal combustion engines are widely used in various industries. Internal combustion engines can operate on a variety of different liquid fuels, gaseous fuels, and various blends. Spark-ignited engines employ an electrical spark to initiate combustion of fuel and air, whereas compression ignition engines typically compress gases in a cylinder to an autoignition threshold such that ignition of fuel begins without requiring a spark. In an attempt to reduce greenhouse gases (GHG), some endeavors have been made to change the primary fuel used in combustions engines from fuels such as diesel to alcohol fuels such as ethanol and methanol, or combinations of these fuels. When alcohol-based fuels, or other oxygenated fuels, are used with diesel fuels, the amount of nitrogen dioxide (NO2) can significantly increase. NO2 can be considered a pollutant due to its effect on humans. Further, NO2 can contribute to the formation and modification of other pollutants such as ozone, particulate matter, as well as acid rain.

Some efforts have been made to reduce the amount of NO2 produced in a diesel engine. For example, International Publication Number WO2020/074446A1 to Yi et. al (the '446 publication) describes one such effort. The '446 publication describes the use of multiple nitrogen oxide detectors in an exhaust gas aftertreatment system. The nitrogen oxide detectors are used to detect concentrations of nitrogen oxides in the exhaust gas. The '446 publication describes a method that can be used to identify which detectors are being used to measure which sections of the aftertreatment system by using the measured concentrations of nitrogen oxides. However, the system (and process) described in the '446 publication suffers from some shortfalls. For example, the measured concentrations of the detectors used in the system of the '446 publication may vary and become inaccurate depending on the amount of NO2 in the exhaust gas. This can lead to incorrect identifications of the locations of the detectors as well as incorrect changes to the system based on detector concentration measurements.

Some examples of the present disclosure are directed to overcoming these and other deficiencies of such systems.

SUMMARY

In an aspect of the present disclosure, an internal combustion engine system includes an internal combustion engine configured to combust a first fuel, wherein a portion of an exhaust of the combustion engine comprises nitric oxide (NO), an oxidizing unit upstream of a selective catalytic reduction (SCR) system configured to oxidize a portion of the NO in the exhaust to form NO2, the selective catalytic reduction (SCR) system configured to receive the NO2 and NO from the oxidizing unit and react at least a portion of the NO2 and NO with a reductant to produce nitrogen and water as an emission from the internal combustion engine system, and a first NOx detector at an inlet of the oxidizing unit, a second NOx detector at an inlet of the SCR system, and a third NOx detector at an outlet of the SCR system, wherein a difference in measured NOx levels by the first NOx detector and the second NOx detector is used to determine a production of NO2 in the oxidizing unit.

In another aspect of the present disclosure, a controller for controlling emissions of an internal combustion engine includes a memory storing computer-executable instructions, and a processor in communication with the memory, the computer-executable instructions causing the processor to perform acts comprising receiving a first NOx volume fraction measured by a first NOx detector at an inlet of an oxidizing unit, the oxidizing unit configured to filter a portion of particulate in an exhaust of the internal combustion engine using a precious metal containing catalyst, wherein the precious metal containing catalyst oxidizes a portion of NO in the exhaust to form NO2, wherein the NO is generated by a combustion of a fuel in the internal combustion engine, receiving a second NOx volume fraction measured by the second NOx detector at an inlet of an SCR system, the SCR system configured to receive the NO2 and NO from the oxidizing unit and react at least a portion of the NO2 and NO with a reductant to produce nitrogen and water as an emission from the internal combustion engine, calculating a difference between the first NOx volume fraction and the second NOx volume fraction, wherein the difference is used to determine a production of NO2 in the oxidizing unit, and determining if the difference between the first NOx volume fraction and the second NOx volume fraction requires an increase in an amount of a reductant being added to the SCR system, a decrease in an amount of the reductant being added to the SCR system, an increase in a reductant additive added to the oxidizing unit, a decrease in the reductant additive added to the oxidizing unit, or no change in the amount of the reductant being added to the SCR system or no change in the amount of the reductant additive being added to the oxidizing unit.

In a still further aspect of the present disclosure, a method of controlling emissions of an internal combustion engine includes receiving a first NOx volume fraction measured by a first NOx detector at an inlet of a diesel particulate filter (DPF), the DPF configured to filter a portion of particulate in an exhaust of the internal combustion engine using a precious metal containing catalyst, wherein the precious metal containing catalyst oxidizes a portion of NO in the exhaust to form NO2, wherein the NO is generated by a combustion of a first fuel and a second fuel in the internal combustion engine, receiving a second NOx volume fraction measured by the second NOx detector at an inlet of an SCR system, the SCR system configured to receive the NO2 and NO from the DPF and react at least a portion of the NO2 and NO with a reductant to produce nitrogen and water as an emission from the internal combustion engine, calculating a difference between the first NOx volume fraction and the second NOx volume fraction, wherein the difference is used to determine a production of NO2 in the DPF, and determining if the difference between the first NOx volume fraction and the second NOx volume fraction requires an increase in an amount of a reductant being added to the SCR system, a decrease in an amount of the reductant being added to the SCR system, or no change in the amount of the reductant being added to the SCR system.

DETAILED DESCRIPTION

Figure 1:
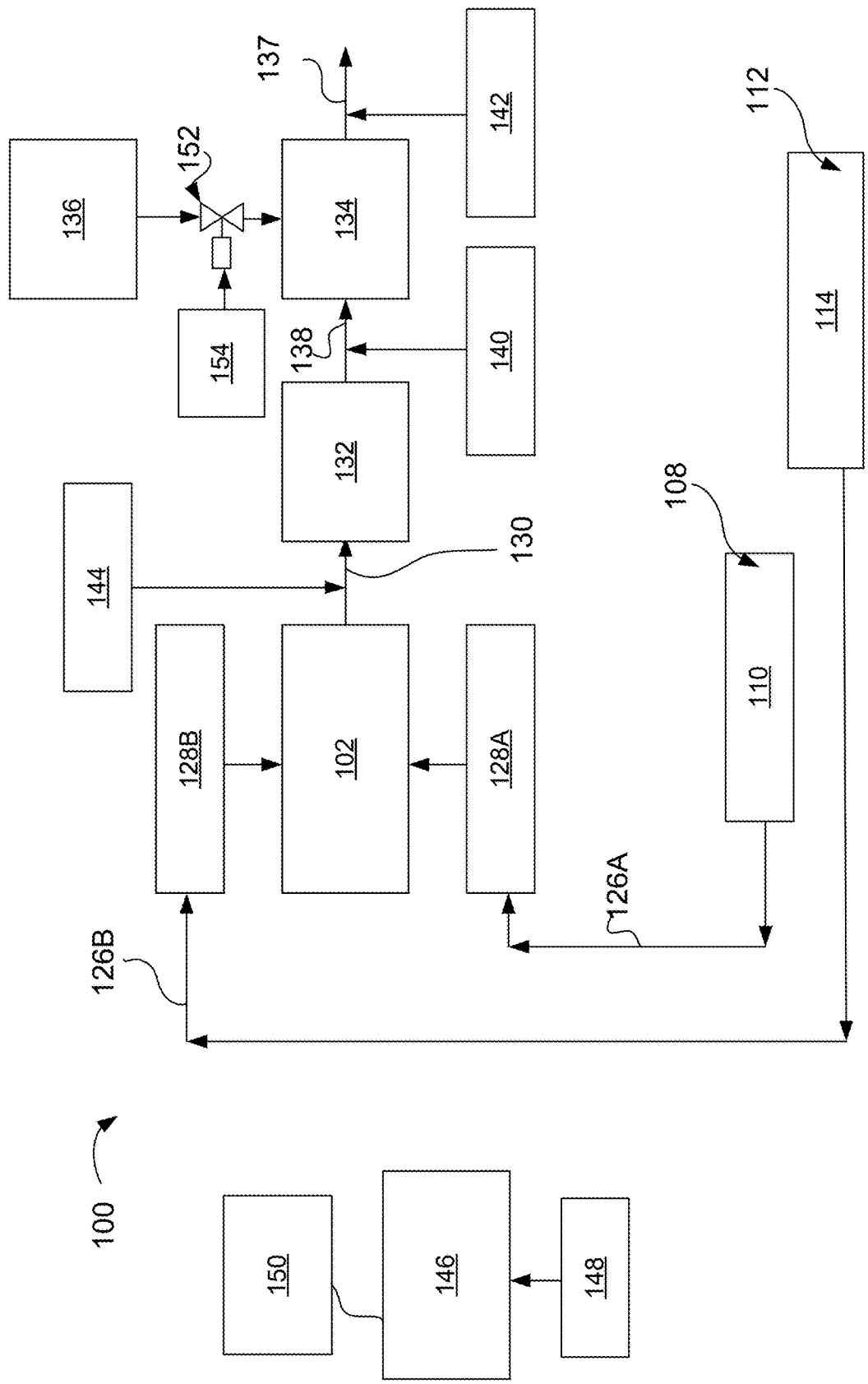
FIG. 1 illustrates an internal combustion engine system configured to control emissions using NO2 levels to calibrate NOx detectors, in accordance with various embodiments of the presently disclosed subject matter.

Wherever possible, the same reference numbers will be used throughout the drawings to refer to the same or like parts. FIG. 1 illustrates an internal combustion engine system 100 configured to control emissions using NO2 levels to calibrate NOx detectors, in accordance with various embodiments of the presently disclosed subject matter. The internal combustion engine system 100 includes an internal combustion engine 102 with a plurality of combustion cylinders (not shown). The internal combustion engine 102 may have any number of combustion cylinders. It will be understood that the combustion cylinders are associated with a piston (not shown) movable between a top dead center position and a bottom dead center position in a generally conventional manner, typically in a four-stroke engine cycle, though other combustion cycles may be used and are considered to be within the scope of the presently disclosed subject matter. The pistons will be coupled with a crankshaft (not shown) rotatable to provide torque for purposes of vehicle propulsion, operating a generator for production of electrical energy, or in still other applications such as operating a compressor, a pump, or various other types of equipment.

The internal combustion engine 102 is fueled by a first fuel 108 stored in a first fuel tank 110 and a second fuel 112 stored in a second fuel tank 114. The first fuel 108 may include a higher cetane/lower octane liquid fuel, and the second fuel 112 may include a lower cetane/higher octane liquid fuel. The terms "higher" and "lower" in this context may be understood as relative terms in relation to one another. Thus, the first fuel 108 may have a higher cetane number and a lower octane number than a cetane number and an octane number of the second fuel 112. The first fuel 108 might include a diesel distillate fuel, dimethyl ether, biodiesel, Hydrotreated Vegetable Oil (HVO), Gas to Liquid (GTL) renewable diesel, any of a variety of liquid fuels with a cetane enhancer, or still another fuel type. The second fuel 112 may include an alcohol fuel such as methanol or ethanol, for example, or still other fuel types such as, but not limited to n-propyl alcohol, isopropyl alcohol, or t-butyl alcohol. For the purposes of FIG. 1, the first fuel 108 is described as diesel fuel and the second fuel 112 is described as methanol, though as noted above, the presently disclosed subject matter may be used with other fuel types. Further, the present disclosure is not limited to a dual fuel engine or an engine combusting more than one fuel. Aspects of the present disclosure may also be used with single fuel engines or multi-fuel engines operating using only one of the fuels. The following description using two fuels is merely for purposes of illustrating an aspect of the present disclosure and is not an intent to limit the scope of the present disclosure to only a dual fuel engine and/or an engine combusting two or more fuels.

In various examples, the first fuel 108 is supplied through feed line 126A to fuel rail 128A and the second fuel 112 is supplied through feed line 126B to fuel rail 128B. It should be noted that the fuel rails 128A and 128B are illustrated as separate rails. As used herein, a "rail" is a fuel line that supplies fuel to injectors (not shown) for combustion. In some examples, the fuel rails 128A and 128B are one or more rails that provide the first fuel 108, second fuel 112, or mixtures thereof. Further, it should be noted that in some examples, the second fuel 112 and/or the first fuel 108 may be provided to combustion cylinders of the internal combustion engine 102 using port fuel injection, direct fuel injection, or various combinations thereof. Exhaust 130 exits the internal combustion engine 102 and enters an oxidizing unit 132. In some examples, the oxidizing unit 132 may be a diesel particulate filter (DPF) upstream of a selective catalytic reduction system. In some examples, a DPF is an exhaust aftertreatment device that is designed to remove particulate matter, or soot, from the exhaust 130. In examples of the presently disclosed subject matter, the DPF can include a precious metal containing catalyst. In some examples, the precious metal containing catalyst of the DPF be ceramic filters with structures covered at least partially by precious metals such as platinum or palladium. In some examples, the DPF may include a monolithic honeycomb substrate coated with a platinum group or palladium group metal catalyst. The precious metals interact with and oxidize pollutants to reduce particulate and other undesirable emissions.

In further examples, the oxidizing unit 132 may be a diesel oxidation catalyst (DOC) unit. The DOC may use an additive or structure such as a monolith honeycomb substrate coated with a platinum group metal catalyst to oxidize NO. In some examples, a portion NO2 in the exhaust 130 is first reduced to NO, and then, a portion of the reduced NO2 is oxidized back to NO2. For example, the NO2 to NO ratio may be 70/30 in the exhaust 130 entering the DOC. In a first stage, the NO2 to NO ratio may change to 20/80, or in some instances, essentially 0/100 whereby all of the NO2 has been reduced to NO. However, as noted above, this ratio does not achieve the 50/50 ratio for the fast SCR reaction. Thus, a portion of the reduced NO2 (now NO) is oxidized back to NO2 in a second stage of the DOC. To achieve the first stage of reduction in the DOC, a reductant additive that is more reactive than NO2 is provided into the DOC in the first stage. The additive can be composed of various compounds including, but not limited to, carbon monoxide (CO), methanol, diesel fuel, and the like. The presently disclosed subject matter is not limited to any particular additive that is more reactive than the NO2. During the first stage, the NO2 from the exhaust 130 is adsorbed onto the precious metal catalyst of the DOC and an atomic oxygen is removed from the NO2, reducing the NO2 to NO. Because of the higher reactivity of the additive, the additive scavenges a portion of the atomic oxygen from the catalyst. During the second stage, the NO is oxidized over the catalyst to form NO2.

When some fuels are combusted, oxides of nitrogen (including NO and NO2) can be formed from the high temperatures created in the flame of combustion and the abundance of nitrogen in the combustion air. To reduce the amount of NOx in emissions from an engine, the internal combustion engine system 100 further includes a selective catalytic reduction (SCR) system 134. The SCR system 134 is made from various porous ceramic materials used as a support, such as titanium oxide, and active catalytic components are usually either oxides of base metals (such as vanadium, molybdenum and tungsten), zeolites, or various precious metals. A reductant 136, typically anhydrous ammonia (NH3), aqueous ammonia (NH4OH), or a urea (CO(NH2)2) solution, is added to a stream of flue or exhaust gas and is reacted onto a catalyst to produce nitrogen and water as an emission from the internal combustion engine 102. As the reaction drives toward completion, nitrogen (N2), and carbon dioxide (CO2), in the case of urea use, are produced.

Based on the compounds entering the SCR system 134 and their respective stoichiometric ratios, the reduction reaction in the SCR system 134 proceeds at various rates, entering the atmosphere as SCR exhaust 137. Equation #1, below, represents a slow rate of a reduction reaction when the entering reactants are in the stoichiometric ratios indicated in Equation #1. Equation #2, below, represents a standard rate of a reduction reaction when the entering reactants are in the stoichiometric ratios indicated in Equation #2. Equation #3, below, represents a fast rate of reduction (fast SCR) reaction when the entering reactants are in the stoichiometric ratios indicated in Equation #3.

$$6NO_2 + 8NH_3 \leftrightarrow 7N_2 + 12H_2O \quad (1)$$

$$4NO + 3O_2 + 4NH_3 \leftrightarrow 4N_2 + 6H_2O \quad (2)$$

$$NO + NO_2 + 2NH_3 \leftrightarrow 2N_2 + 3H_2O \quad (3)$$

Because of the rate of the reduction reaction, in some examples, a stoichiometric ratio allowing for Equation #3 may be preferable. The optimal stoichiometric ratio to achieve Equation #3 is when NO is in a 50/50 stoichiometric ratio with NO2, thus allowing the SCR system 134 to proceed with the fast SCR reaction. This "fast SCR" reaction plays a role at 180-300° C. in boosting the denitrification (de-NOx) performance. Thus, in some examples, it may be required or desired to determine the amount of NOx and/or NO2 entering the SCR system 134. To measure a change of the NOx between an SCR input 138 and the SCR exhaust 137, an SCR input detector 140 may be used to measure the NOx entering the SCR system 134 and an SCR output detector 142 is used to measure the NOx exiting the SCR system 134. In some examples, however, the measured NOx volume fractions by the SCR input detector 140 and the SCR output detector 142 may be affected by the amount of NO2 in the stream.

Figure 2:
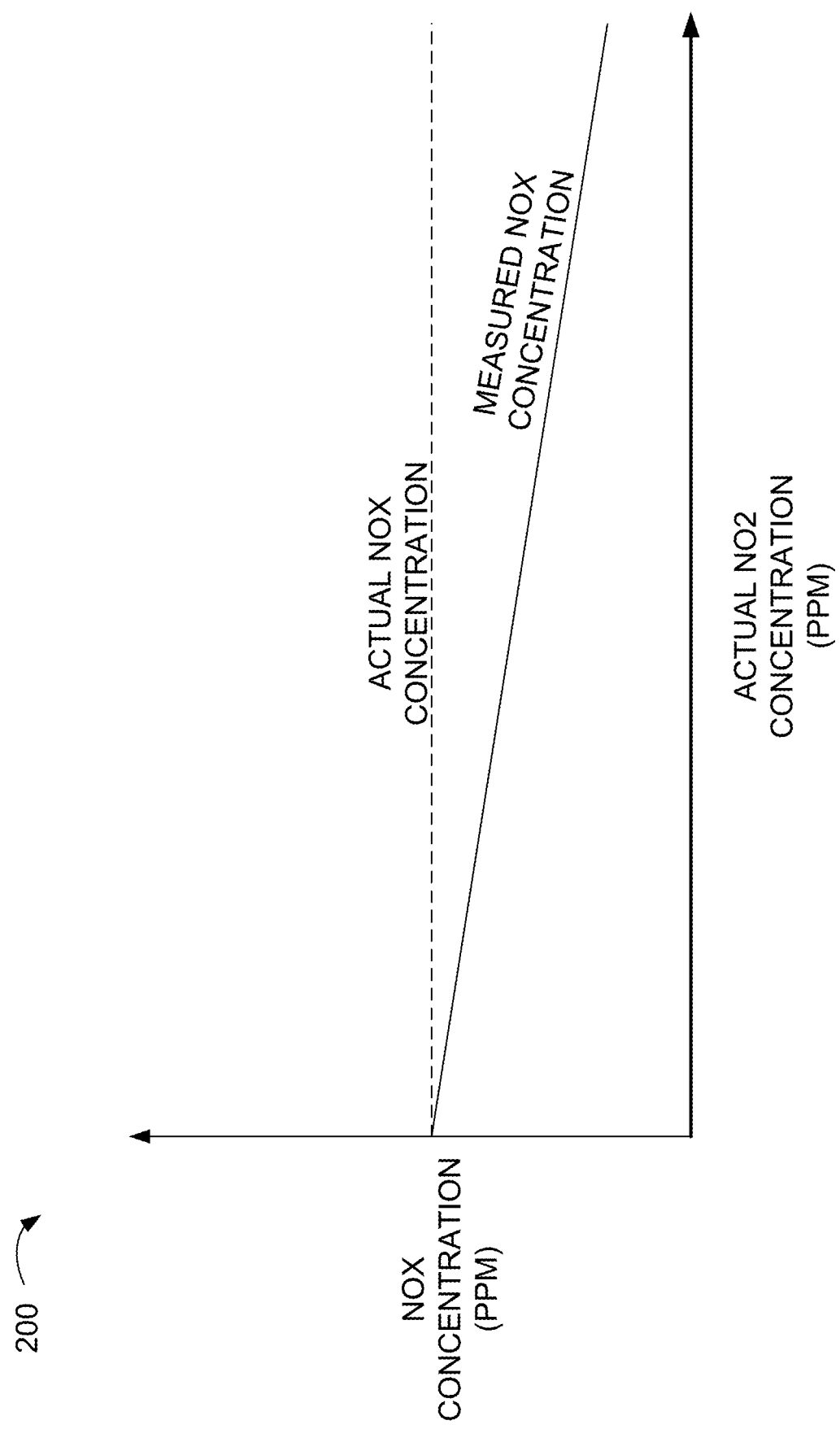
FIG. 2 is a graph illustrating how NO2 volume fractions in a stream may affect the measured NOx volume fraction by an SCR input detector and/or an SCR output detector, in accordance with various embodiments of the presently disclosed subject matter.

FIG. 2 is a graph 200 illustrating how NO2 volume fractions in a stream may affect the measured NOx volume fraction by the SCR input detector 140 and/or the SCR output detector 142, in accordance with various embodiments of the presently disclosed subject matter. The X-axis of the graph 200 represents an increase of actual NO2 volume fraction in a stream from 0 percent at the origin to an increasing percentage along the X-axis. The Y-axis of the graph 200 represents NOx volume fraction, either the actual NOx volume fraction or the measured NOx volume fraction as measured by the SCR input detector 140 and/or the SCR output detector 142. As illustrated in the graph 200, as the NO2 volume fraction in a stream increases, the measured NOx volume fraction deviates from the actual NOx volume fraction. Thus, even when the actual NOx volume fraction is assumed to be at a constant parts per million (PPM), the increasing volume fraction of NO2 in a stream can cause the measured NOx to decrease. Factors such as engine performance, power, the fuels and the amount/mixture of fuels used, and the use of a precious metal containing catalyst, such as the oxidizing unit 132, may affect the volume fraction of NO2 in a stream, as illustrated in FIG. 3, below.

Figure 3:
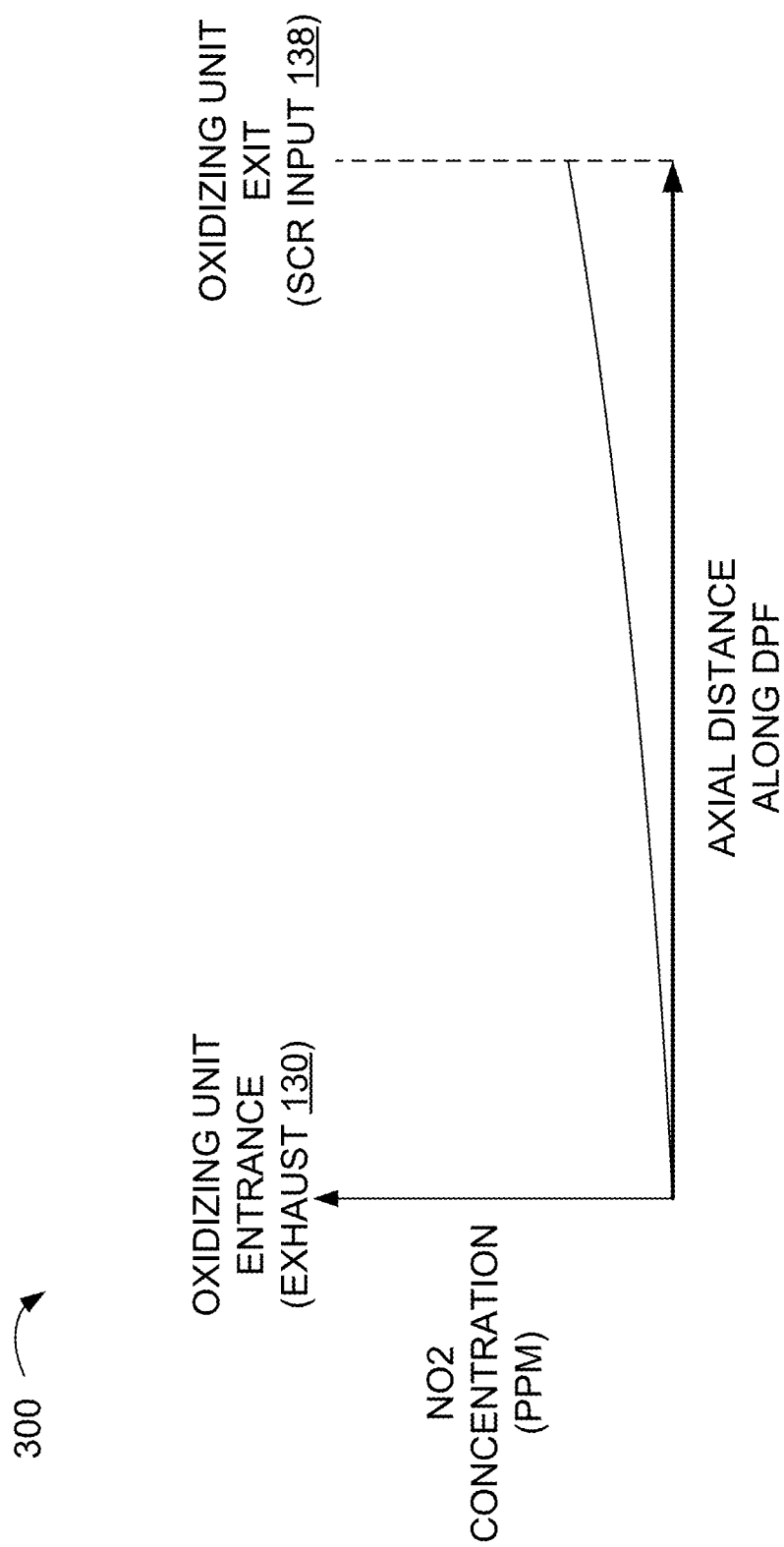
FIG. 3 is a graph illustrating how NO2 volume fractions increase when a DPF containing a precious metal catalyst is used, in accordance with various embodiments of the presently disclosed subject matter.

FIG. 3 is a graph 300 illustrating how NO2 volume fractions increase when the oxidizing unit 132 containing a precious metal catalyst is used, in accordance with various embodiments of the presently disclosed subject matter. In FIG. 3, the X-axis of the graph 300 illustrates the linear travel distance along the oxidizing unit 132 from the exhaust 130 to the scr input 138. As illustrated in FIG. 3, as the stream travels from the exhaust 130 to the scr input 138, the precious metal containing catalyst oxidizes a portion of the NO, increasing the NO2 volume fraction. Because the use of a precious metal catalyst may also affect the volume fraction NO2 in a stream, in some examples of the presently disclosed subject matter, changes in NO2 volume fraction may be detected using additional NOx detectors.

Returning to FIG. 1, an engine out NOx detector 144 may be at an inlet of the oxidizing unit 132 and is used to determine changes in NO2 volume fraction. The engine out NOx detector 144 detects NOx levels at the exhaust 130 of the internal combustion engine 102. In some examples, because the engine out NOx detector 144 is used at the exhaust 130 of the internal combustion engine 102, the NO2 volume fraction may be at or near zero ppm. In other examples, the NO2 volume fractions may be known or determined by the manufacturer of the internal combustion engine 102. For example, it may be determined that at a certain power level and/or fuel mixture, the exhaust 130 should comprise a certain ppm of NO2. In other examples, an absolute value of the NO2 volume fraction may not be known, whereby the engine out NOx detector 144 may be used to determine changes in NO2 volume fractions along a baseline or predetermined value. The NOx detector 144, in some examples, may also be used to determine the performance of the oxidizing unit 132 or other devices that use a precious metal as a catalyst whereby a portion of the NO entering the device is oxidized to NO2.

As mentioned above, the engine out NOx detector 144 is used to set a baseline for NO2 volume fraction so that the NOx volume fractions measured by the SCR input detector 140 and the SCR output detector 142 can be adjusted. For example, the engine out NOx detector 144 may measure NOx volume fraction to be 100 ppm and the SCR input detector 140 may measure NOx volume fraction to be 80 ppm. Although the ratio of NO2 to NO across the oxidizing unit 132 may change, the total amount of NO2 and NO should remain constant. Thus, the difference in the measured NOx volume fraction between the engine out NOx detector 144 and the SCR input detector 140 may be caused by an increase in the amount of the NO2 relative to the amount of NO. In some examples, the difference in the measured NOx volume fraction between the engine out NOx detector 144 and the SCR input detector 140, representing a change in the amount of NO2 relative to NO, may be used in various ways. For example, the volume fraction of NOx as detected by the SCR input detector 140 and/or the SCR output detector 142 may be compensated or adjusted using the difference. For example, an additional 20 ppm of NOx may be added to the measured NOx volume fraction levels using the example provided above.

In other examples, the operation of the oxidizing unit 132 and/or the internal combustion engine 102 may be adjusted using the difference between the measured NOx volume fraction by the engine out NOx detector 144 and the SCR input detector 140 to achieve certain parameters. As mentioned above, in some examples, it may be preferable for the SCR input 138 to be comprised of a near 50/50 mixture of NO and NO2 to achieve the fast SCR reactor of equation #3, above. Thus, the change in the measured NOx volume fraction by the engine out NOx detector 144 and the SCR input detector 140 may be translated to an increase in the volume fraction of NO2 entering the SCR input 138. For example, it may be known that each ppm difference between the measured NOx volume fraction by the engine out NOx detector 144 and the SCR input detector 140 comprises a 1 ppm increase in the NO2 and a 1 ppm decrease in the NO volume fractions in the stream.

Thus, continuing with the present example, the 20 ppm difference between the measured NOx volume fraction by the engine out NOx detector 144 and the SCR input detector 140 may represent a 20 ppm increase in NO2. If the exhaust 130 is known to have 0 ppm NO2, the SCR input 138 would be comprised of a ratio of 20 ppm NO2 to 80 ppm NO. If it is desired to achieve close to the 50/50 ratio for a fast SCR reaction, various aspects may be changed. For example, if within specifications, the temperature of the oxidizing unit 132 may be increased to increase the oxidation of the NO to NO2 within the oxidizing unit 132. In a similar manner, if it is determined, using the difference between the measured NOx volume fraction by the engine out NOx detector 144 and the SCR input detector 140, that the amount of NO2 is too high, in some examples, the temperature of the oxidizing unit 132 may be decreased. In some examples, the internal combustion engine system 100 may be designed to allow for a reduction in the amount of NO2 produced. For example, the oxidizing unit 132 may be designed to generate an NO2/NO ratio of 60 percent at the beginning of a lifecycle of the oxidizing unit 132. As the catalyst within the oxidizing unit 132 ages through use, the amount of NO2 will decrease, decreasing the NO2/NO ratio towards and perhaps below a desired ratio. It should be understood that other aspects may be changed, or additional features used, to achieve a desired NO2 volume fraction in the SCR input 138 and are considered to be within the scope of the presently disclosed subject matter. Further, it should be noted that the formation of NO2 may be dependent on the operating temperature of the oxidizing unit 132 and/or the SCR system 134. In some examples, if the temperature of the oxidizing unit 132 is above approximately 300 C-350 C, then an increase in a temperature of the oxidizing unit 132 may decrease the NO2 formation rate. If the oxidizing unit 132 temperature is below approximately 300 C-350 C, then an increase in the temperature of the oxidizing unit 132 may increase the NO2 formation rate.

In some examples, the difference between the measured NOx volume fraction by the engine out NOx detector 144 and the SCR input detector 140 may be used to adjust other aspects of the internal combustion engine system 100, such as the SCR system 134. As noted above, the reductant 136 may be used to reduce the amount of NOx in the SCR exhaust 137. However, the performance of the reductant 136 may be affected by the amount of the NO2. Thus, in some examples, a controller 146 may be used to adjust the amount of the reductant 136 introduced into the SCR system 134. The controller 146 can be a component of the internal combustion engine 102 engine control unit (ECU) or engine control module (ECM) that controls the amount of each of the fuels and/or the mixture of fuels between the first fuel 108 and the second fuel 112. The controller 146 is implemented by one or more processors having instructions stored in one or more memory devices that control various aspects of the internal combustion engine system 100. For example, the controller 146 may be used to determine the amount of fuels to provide the internal combustion engine 102 at a given power level as indicated by a power signal 148 provided to the controller 146. The controller 146 receives the power signal 148 and, using a fuel map 150, determines the amount of fuels to provide the internal combustion engine 102. The fuel map 150 is a table in which for a given power level of the internal combustion engine 102, an amount of fuel and a particular mixture of fuels are provided to the controller 146.

In some examples, the controller 146 may also use the difference in the measured NOx volume fraction between the engine out NOx detector 144 and the SCR input detector 140 to control a reductant valve 152. The reductant valve 152 may be a proportional, throttle, or gate valve opened or closed using an actuator used to control the amount of the reductant 136 provided to the SCR system 134. The controller 146 may receive the measured NOx volume fraction from the engine out NOx detector 144 and the SCR input detector 140, determine a difference, and then, based on the difference, open or close the reductant valve 152 by issuing valve signal 154 to change the amount of the reductant 136 entering the SCR system 134. For example, if the difference indicates that more of the reductant 136 is needed, the controller 146 issues an open signal to increase the amount of the reductant 136 entering the SCR system 134. Similarly, if the difference indicates that less of the reductant 136 is needed, the controller 146 issues a close signal to decrease the amount of the reductant 136 entering the SCR system 134. The use of the difference is described in more detail in FIG. 4, below.

Figure 4:
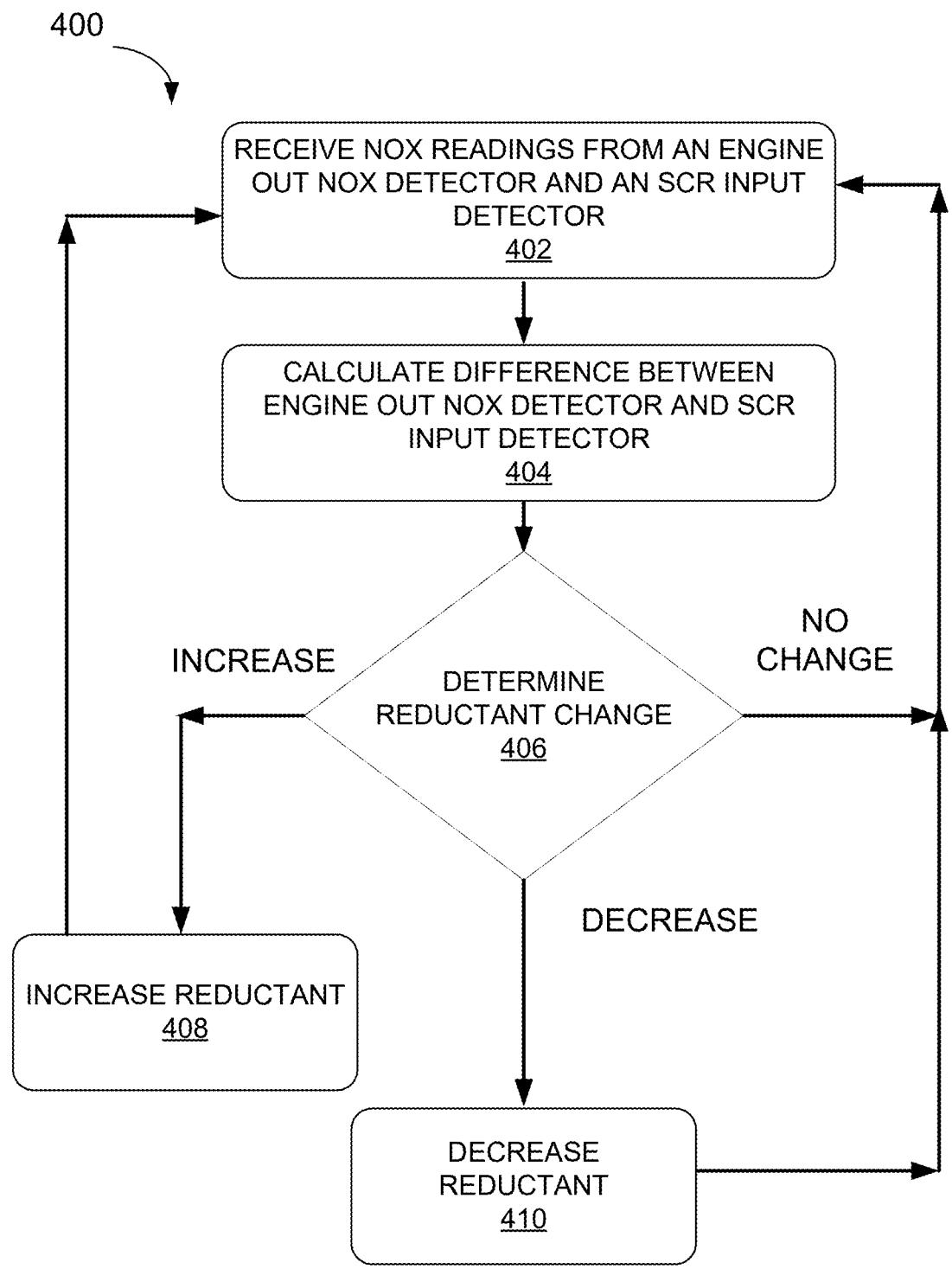
FIG. 4 illustrates a method for operating an internal combustion engine in which a controller uses the difference in the measured NOx volume fraction between an engine out NOx detector and an SCR input detector to control a reductant valve, in accordance with various examples of the presently disclosed subject matter.

FIG. 4 illustrates a method 400 for operating the internal combustion engine 102 in which the controller 146 uses the difference in the measured NOx volume fraction between the engine out NOx detector 144 and the SCR input detector 140 to control a reductant valve 152, in accordance with various examples of the presently disclosed subject matter. The method 400 and other processes described herein are illustrated as example flow graphs, each operation of which may represent a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

The method 400 commences at step 402, where the controller 146 receives a measure of NOx volume fractions from the engine out NOx detector 144 and the SCR input detector 140. As noted above, because the oxidizing unit 132, or another device not illustrated in FIG. 1, may use one or more types of precious metal catalysts, a portion of the NO entering the oxidizing unit 132 may be converted to NO2.

The method 400 continues at step 404, where the controller 146 determines the difference between the NOx measured by the engine out NOx detector 144 and the SCR input detector 140. The amount of the NO2 generated in the oxidizing unit 132 may be determined using the difference between the NOx measured by the engine out NOx detector 144 and the SCR input detector 140, as in some examples, NOx detector measurements may be affected by the amount of the NO2 in the stream. As discussed above, in some examples, for a given actual NOx volume fraction in a stream, a stream having one level of NO2 may have a measured NOx volume fraction that is different than another stream having a different level of NO2. This difference may be used to determine the amount of NO2 generated.

The method 400 continues at step 406, where the controller 146 determines, using the difference, if the amount of the reductant 136 is to be increased, decreased, or remain the same. The change in the reductant 136 may be based on how the volume fraction of NO2 in the stream affects that SCR system 134. More of the reductant 136 may be needed if the NO2 is above a certain level and less of the reductant 136 may be needed if the NO2 is below a certain level.

If at step 406 the controller 146 determines that the difference does not require a change in the amount of the reductant 136 added to the SCR system, the method 400 continues to step 402, where the controller 146 continues to receive NOx readings from the engine out NOx detector and the SCR input detector. If at step 406 the controller 146 determines that the difference indicates that an increase in the amount of the reductant 136 is required, the method 400 continues to step 408, where the controller 146 issues an open signal to increase the amount of the reductant 136 entering the SCR system 134. The method 400 continues to step 402, where the controller 146 continues to receive NOx readings from the engine out NOx detector and the SCR input detector. If at step 406 the controller 146 determines that the difference indicates that a decrease in the amount of the reductant 136 is required, the method 400 continues to step 410, where the controller 146 issues a close signal to decrease the amount of the reductant 136 entering the SCR system 134. In some examples, if the oxidizing unit 132 is configured to receive a reductant additive, such as in a DOC, step 406 may also include a determination if there is to be an increase in an amount of the reductant additive being added to the oxidizing unit 132 or a decrease in an amount of the reductant additive being added to the oxidizing unit. The method 400 continues to step 402, where the controller 146 continues to receive NOx readings from the engine out NOx detector and the SCR input detector.

Figure 5:
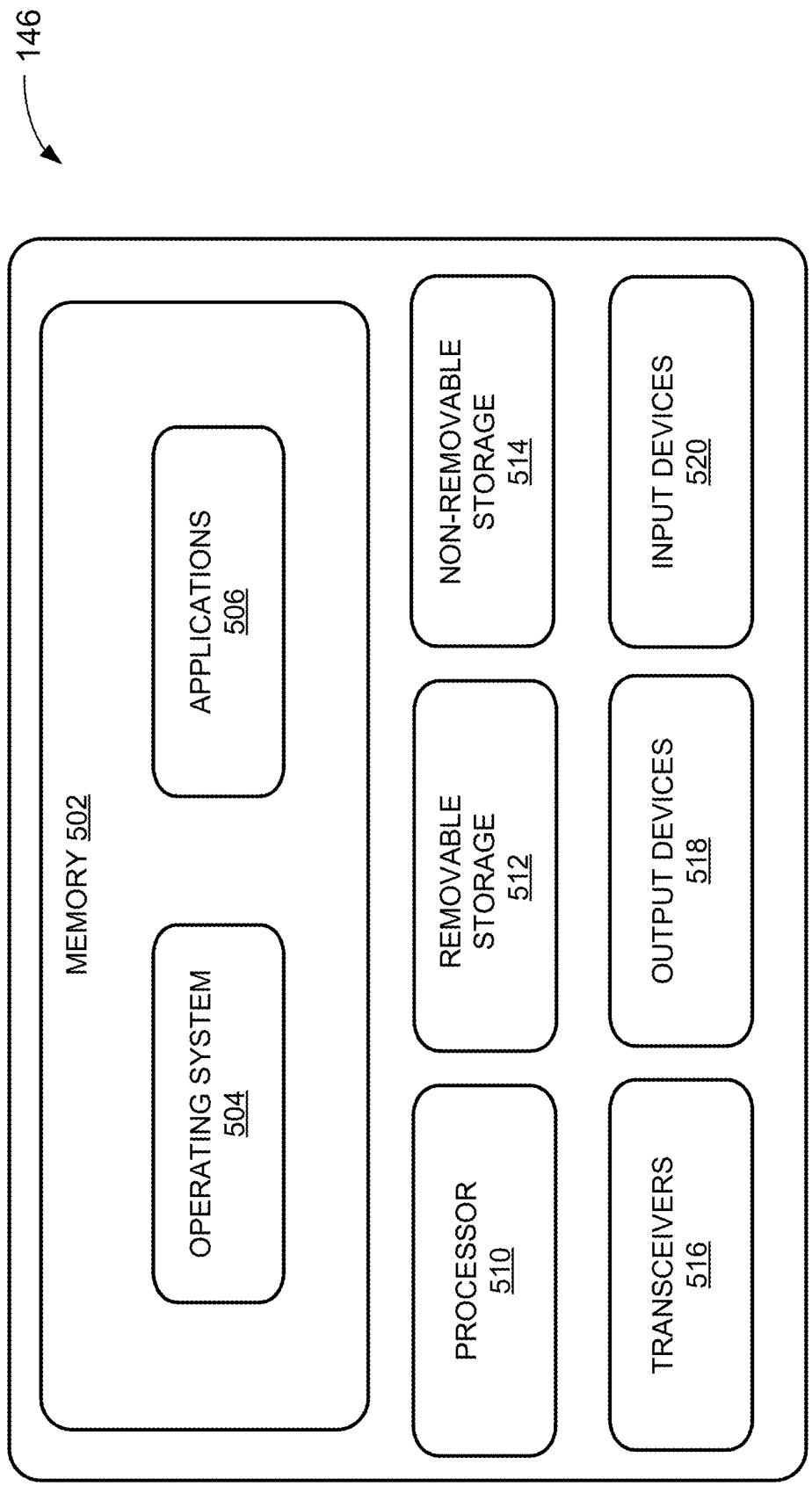
FIG. 5 depicts a component level view of a controller for use with the systems and methods described herein, in accordance with various examples of the presently disclosed subject matter.

FIG. 5 depicts a component level view of the controller 146 for use with the systems and methods described herein, in accordance with various examples of the presently disclosed subject matter. The controller 146 could be any device capable of providing the functionality associated with the systems and methods described herein. The controller 146 can comprise several components to execute the above-mentioned functions. The controller 146 may be comprised of hardware, software, or various combinations thereof. As discussed below, the controller 146 can comprise memory 502 including an operating system (OS) 504 and one or more standard applications 506. The standard applications 506 may include applications that provide for receiving and calculating the difference between measured NOx levels and generating one or more signals to control one or more components of the environment.

The controller 146 can also comprise one or more processors 510 and one or more of removable storage 512, non-removable storage 514, transceiver(s) 516, output device(s) 518, and input device(s) 520. In various implementations, the memory 502 can be volatile (such as random access memory (RAM)), non-volatile (such as read only memory (ROM), flash memory, etc.), or some combination of the two. The memory 502 can be stored on a remote server or a cloud of servers accessible by the controller 146.

The memory 502 can also include the OS 504. The OS 504 varies depending on the manufacturer of the controller 146. The OS 504 contains the modules and software that support basic functions of the controller 146, such as scheduling tasks, executing applications, and controlling peripherals. The OS 504 can also enable the controller 146 to send and retrieve other data and perform other functions, such as transmitting control signals using the transceivers 516 and/or output devices 518 and receiving signals using the input devices 520.

The controller 146 can also comprise one or more processors 510. In some implementations, the processor(s) 510 can be one or more central processing units (CPUs), graphics processing units (GPUs), both CPU and GPU, or any other combinations and numbers of processing units. The controller 146 may also include additional data storage devices (removable and/or non-removable) such as, for example, magnetic disks, optical disks, or tape. Such additional storage is illustrated in FIG. 5 by removable storage 512 and non-removable storage 514.

Non-transitory computer-readable media may include volatile and nonvolatile, removable and non-removable tangible, physical media implemented in technology for storage of information, such as computer readable instructions, data structures, program modules, or other data. The memory 502, removable storage 512, and non-removable storage 514 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information, which can be accessed by the controller 146. Any such non-transitory computer-readable media may be part of the controller 146 or may be a separate database, databank, remote server, or cloud-based server.

In some implementations, the transceiver(s) 516 include any transceivers known in the art. In some examples, the transceiver(s) 516 can include wireless modem(s) to facilitate wireless connectivity with other components (e.g., between the controller 146 and a wireless modem that is a gateway to the Internet), the Internet, and/or an intranet. Specifically, the transceiver(s) 516 can include one or more transceivers that can enable the controller 146 to send and receive data. Thus, the transceiver(s) 516 can include multiple single-channel transceivers or a multi-frequency, multi-channel transceiver to enable the controller 146 to send and receive video calls, audio calls, messaging, etc. The transceiver(s) 516 can enable the controller 146 to connect to multiple networks including, but not limited to 2G, 3G, 4G, 5G, and Wi-Fi networks. The transceiver(s) 516 can also include one or more transceivers to enable the controller 146 to connect to future (e.g., 6G) networks, Internet-of-Things (IoT), machine-to machine (M2M), and other current and future networks.

The transceiver(s) 516 may also include one or more radio transceivers that perform the function of transmitting and receiving radio frequency communications via an antenna (e.g., Wi-Fi or Bluetooth®). In other examples, the transceiver(s) 516 may include wired communication components, such as a wired modem or Ethernet port, for communicating via one or more wired networks. The transceiver(s) 516 can enable the controller 146 to facilitate audio and video calls, download files, access web applications, and provide other communications associated with the systems and methods, described above.

In some implementations, the output device(s) 518 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 518 can also include speakers, or similar devices, to play sounds or ringtones when an audio call or video call is received. Output device(s) 518 can also include ports for one or more peripheral devices, such as headphones, peripheral speakers, or a peripheral display.

In various implementations, input device(s) 520 include any input devices known in the art. For example, the input device(s) 520 may include a camera, a microphone, or a keyboard/keypad. The input device(s) 520 can include a touch-sensitive display or a keyboard to enable users to enter data and make requests and receive responses via web applications (e.g., in a web browser), make audio and video calls, and use the standard applications 506, among other things. A touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 520 and an output device 518.

INDUSTRIAL APPLICABILITY

The present disclosure relates generally to the use of an engine out NOx detector to compensate for variable NO2 volume fractions in an exhaust of the engine. The measured NOx volume fraction of some NOx detectors can change based on the ratio of NO2 to NO in an exhaust stream of the engine. For example, the NOx volume fraction as measured by a NOx detector can decrease if the amount of NO2 relative to NO is increases. This change in measured NOx volume fractions can cause issues with the operation of an aftertreatment system that uses the NOx detector measurements to control aspects of the engine and aftertreatment system. In addition to the affect that NO2 has on some NOx detectors, the amount of the NO2 in an exhaust stream can change if certain types of devices, such as diesel particular filters, use precious metal containing catalysts. These catalysts can oxidize a portion of NO entering the device into NO2. Thus, which the amount of the NO2 at the exhaust of the engine may be known through testing or other methods, the amount of NO2 entering an aftertreatment device such as a selective catalyst reactor (SCR) system may change depending on the operation of other devices that have precious metal containing catalysts.

Some examples of the presently disclosure use a NOx detector at the exhaust of the engine to set a baseline for the use of other NOx detectors. The NO2 levels at the exhaust may be relatively known. Thus, differences in the measured NOx volume fractions levels between the NOx detector at the exhaust of the engine and other downstream NOx detectors may be attributable to the production of NO2 by one or more precious metal containing devices. The calculated difference may be used to estimate how the effectiveness of the precious metal containing device. For example, a diesel particulate filter may have a precious metal containing catalyst. If the catalyst is producing a significantly less amount of NO2, it may be determined that the filter is near the end of its lifecycle of use. Additionally, using a real-time measurement of the production of NO2, i.e., the difference in NOx measurements, the length of the use of a device may be more accurately determined, potentially reducing an early and/or unneeded replacement of that device.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

What is claimed is:

1. An internal combustion engine system, comprising:
an internal combustion engine configured to combust a first fuel, wherein a portion of an exhaust of the internal combustion engine comprises nitric oxide (NO);
an oxidizing unit upstream of a selective catalytic reduction (SCR) system configured to oxidize a portion of the NO in the exhaust to form NO2;
the selective catalytic reduction (SCR) system configured to receive the NO2 and NO from the oxidizing unit and react at least a portion of the NO2 and NO with a reductant to produce nitrogen and water as an emission from the internal combustion engine system;
a first NOx detector at an inlet of the oxidizing unit, a second NOx detector at an inlet of the SCR system, and a third NOx detector at an outlet of the SCR system, wherein a difference in measured NOx levels by the first NOx detector and the second NOx detector is used to determine a production of NO2 in the oxidizing unit; and
a controller comprising:
a memory storing computer-executable instructions; and
a processor in communication with the memory, the computer-executable instructions causing the processor to perform acts comprising:
receiving a first NOx volume fraction measured by the first NOx detector:
receiving a second NOx volume fraction measured by the second NOx detector;
determining a difference between the first NOx volume fraction and the second NOx volume fraction; and
determining if the difference between the first NOx volume fraction and the second NOx volume fraction requires:
an increase in an amount of a reductant being added to the SCR system;

a decrease in an amount of the reductant being added to the SCR system;

an increase in a reductant additive added to the oxidizing unit;

a decrease in the reductant additive added to the oxidizing unit; or no change in the amount of the reductant being added to the SCR system or no change in the amount of the reductant additive being added to the oxidizing unit.

2. The internal combustion engine system of claim 1, wherein the first fuel comprises diesel fuel.

3. The internal combustion engine system of claim 1, wherein the internal combustion engine is further configured to combust a second fuel, wherein the second fuel comprises methanol, ethanol, n-propyl alcohol, isopropyl alcohol, or t-butyl alcohol.

4. The internal combustion engine system of claim 1, wherein the oxidizing unit comprises a diesel particulate filter configured to filter a portion of particulate in the exhaust of the internal combustion engine using a precious metal containing catalyst.

5. The internal combustion engine system of claim 1, wherein the oxidizing unit comprises a diesel oxidation catalyst configured to oxidize the portion of the NO in the exhaust to form the NO2.

6. The internal combustion engine system of claim 1, wherein the computer-executable instructions to cause the processor to perform the act comprising determining that an increase in the amount of the reductant being added to the SCR system comprises computer-executable instructions to cause the processor to perform an act comprising issuing a valve open signal to a reductant valve to increase the amount of the reductant being added to the SCR system.

7. The internal combustion engine system of claim 1, wherein the computer-executable instructions to cause the processor to perform the act comprising determining that a decrease in the amount of the reductant being added to the SCR system comprises computer-executable instructions to cause the processor to perform an act comprising issuing a valve close signal to a reductant valve to decrease the amount of the reductant being added to the SCR system.

8. The internal combustion engine system of claim 1, wherein the reductant comprises anhydrous ammonia (NH3), aqueous ammonia (NH4OH), or a urea (CO(NH2)2) solution.

9. A controller for controlling emissions of an internal combustion engine, the controller comprising:

a memory storing computer-executable instructions; and a processor in communication with the memory, the computer-executable instructions causing the processor to perform acts comprising:

receiving a first NOx volume fraction measured by a first NOx detector at an inlet of an oxidizing unit, the oxidizing unit configured to filter a portion of particulate in an exhaust of the internal combustion engine using a precious metal containing catalyst, wherein the precious metal containing catalyst oxidizes a portion of NO in the exhaust to form NO2, wherein the NO is generated by a combustion of a fuel in the internal combustion engine;

receiving a second NOx volume fraction measured by the second NOx detector at an inlet of an SCR system, the SCR system configured to receive the NO2 and NO from the oxidizing unit and react at least a portion of the NO2 and NO with a reductant to produce nitrogen and water as an emission from the internal combustion engine;

calculating a difference between the first NOx volume fraction and the second NOx volume fraction, wherein the difference is used to determine a production of NO2 in the oxidizing unit; and determining if the difference between the first NOx volume fraction and the second NOx volume fraction requires:

an increase in an amount of a reductant being added to the SCR system;

a decrease in an amount of the reductant being added to the SCR system;

an increase in a reductant additive added to the oxidizing unit;

a decrease in the reductant additive added to the oxidizing unit; or no change in the amount of the reductant being added to the SCR system or no change in the amount of the reductant additive being added to the oxidizing unit.

10. The controller of claim 9, wherein the computer-executable instructions to cause the processor to perform the act comprising determining that an increase in the amount of the reductant being added to the SCR system comprises computer-executable instructions to cause the processor to perform an act comprising issuing a valve open signal to a reductant valve to increase the amount of the reductant being added to the SCR system.

11. The controller of claim 9, wherein the computer-executable instructions to cause the processor to perform the act comprising determining that a decrease in the amount of the reductant being added to the SCR system comprises computer-executable instructions to cause the processor to perform an act comprising issuing a valve close signal to a reductant valve to decrease the amount of the reductant being added to the SCR system.

12. The controller of claim 9, wherein the oxidizing unit comprises a diesel particulate filter (DPF), wherein the DPF comprises a monolithic honeycomb substrate, and wherein the precious metal containing catalyst comprises a platinum group metal catalyst or a palladium group metal catalyst.

13. The controller of claim 9, the reductant comprises anhydrous ammonia (NH3), aqueous ammonia (NH4OH), or a urea (CO(NH2)2) solution.

14. The controller of claim 9, wherein the internal combustion engine is further configured to combust a second fuel, wherein the second fuel comprises methanol, ethanol, n-propyl alcohol, isopropyl alcohol, or t-butyl alcohol.

15. A method of controlling emissions of an internal combustion engine, comprising:

receiving a first NOx volume fraction measured by a first NOx detector at an inlet of a diesel particulate filter (DPF), the DPF configured to filter a portion of particulate in an exhaust of the internal combustion engine using a precious metal containing catalyst, wherein the precious metal containing catalyst oxidizes a portion of NO in the exhaust to form NO2, wherein the NO is generated by a combustion of a first fuel and a second fuel in the internal combustion engine;

receiving a second NOx volume fraction measured a second NOx detector at an inlet of an SCR system, the SCR system configured to receive the NO2 and NO from the DPF and react at least a portion of the NO2 and NO with a reductant to produce nitrogen and water as an emission from the internal combustion engine;

calculating a difference between the first NOx volume fraction and the second NOx volume fraction, wherein the difference is used to determine a production of NO2 in the DPF; and determining if the difference between the first NOx volume fraction and the second NOx volume fraction requires an increase in an amount of a reductant being added to the SCR system, a decrease in an amount of the reductant being added to the SCR system, or no change in the amount of the reductant being added to the SCR system.

16. The method of claim 15, wherein:

increasing the amount of the reductant being added to the SCR system comprises issuing a valve open signal to a reductant valve to increase the amount of the reductant being added to the SCR system; and decreasing the amount of the reductant being added to the SCR system comprises issuing a valve close signal to a reductant valve to increase the amount of the reductant being added to the SCR system.

17. The method of claim 15, wherein the first fuel comprises diesel and the second fuel comprises methanol, ethanol, n-propyl alcohol, isopropyl alcohol, or t-butyl alcohol.

18. The method of claim 15, further comprising:

receiving the NO2 and NO from the DPF into the SCR system; and reacting the NO2 and NO with the reductant to produce nitrogen and water as the emission from the internal combustion engine.

19. The method of claim 15, further comprising determining an NO2 volume fraction in the exhaust using a fuel map.

20. The internal combustion engine system of claim 1, wherein the acts further comprise:

calculating a second difference between the first NOx volume fraction and the second NOx volume fraction, wherein the second difference is used to determine a second production of NO2 in the oxidizing unit; and determining if the second difference between the first NOx volume fraction and the second NOx volume fraction requires:

an increase in an amount of the reductant being added to the SCR system;

a decrease in an amount of the reductant being added to the SCR system;

an increase in the reductant additive added to the oxidizing unit;

a decrease in the reductant additive added to the oxidizing unit; or no change in the amount of the reductant being added to the SCR system or no change in the amount of the reductant additive being added to the oxidizing unit.

* * * * *